Aug. 24, 1943. J. JANDASEK 2,327,647
TURBO TRANSMISSION
Filed Dec. 2, 1939 2 Sheets-Sheet 1

INVENTOR
Joseph Jandasek.
BY
ATTORNEYS.

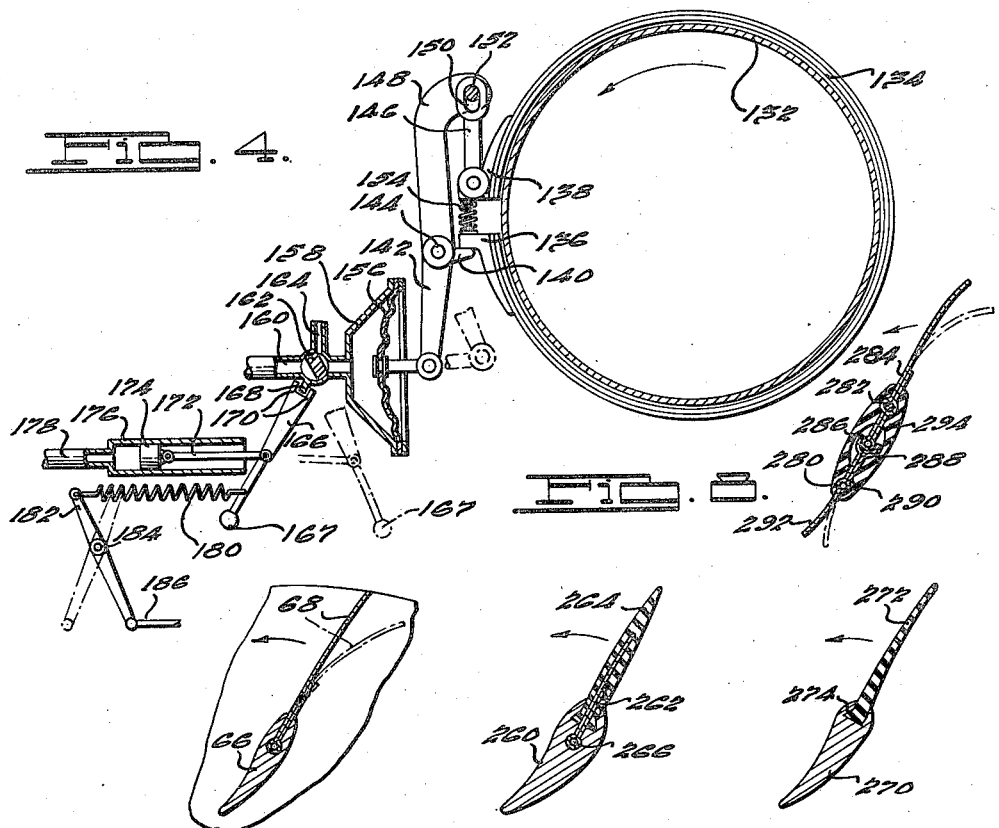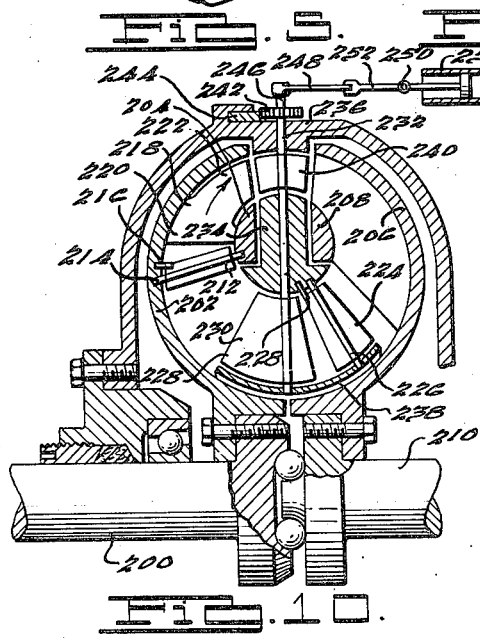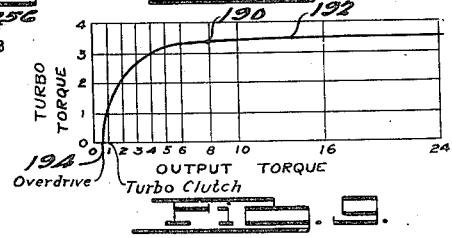

Patented Aug. 24, 1943

2,327,647

UNITED STATES PATENT OFFICE 2,327,647

TURBO TRANSMISSION

Joseph Jandasek, Detroit, Mich., assignor to Bendix Aviation Corporation, South Bend, Ind., a corporation of Delaware Application December 2, 1939, Serial No. 307,285

11 Claims. (Cl. 74—189.5)

This invention relates to transmissions and more particularly to transmissions of the turbo torque converter type.

An object of this invention is to provide a combined turbo and mechanical transmission having means to lock the impeller of the turbo unit thereby rendering said unit inoperative.

A further object of the invention is to provide means operable upon locking of the impeller of the turbo unit to transmit power at over drive through the mechanical transmission unit.

Another object of the invention is to provide automatically operable means influenced jointly by engine throttle position and the speed of the vehicle to automatically lock and unlock the impeller unit of the turbo transmission.

Yet a further object is to provide means under the control of throttle position and vehicle speed to automatically lock or unlock the impeller to selectively render the turbo unit operative or inoperative.

Another object of the invention is to provide a novel power transmitting unit wherein the driven shaft rotates slower than the driving shaft during normal operations and wherein means are provided to automatically rotate the driving shaft at a higher speed than the driven shaft when it is desired to employ the resistance of the engine as a braking force.

A further object of this invention is to provide fluid pressure actuated means controlled by the speed and power output of the engine driving the transmission to actuate the fluid deflecting gates of the turbo transmission.

Another object of the invention is to provide automatically flexible blades which may be associated with an impeller to automatically vary the torque ratio in proportion to the load being transmitted through the turbo unit.

Yet another object is to provide an improved flexible blade formed in part by resilient material bonded to a flexible member to render the structure more streamlined.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Figure 4 is a schematic part sectional view taken substantially on the line 4—4 of Figure 1;

Figure 5 is a sectional view taken substantially on the line 5—5 of Figure 1;

Figure 6 is a view similar to Figure 5 showing a modified form of impeller blade;

Figure 7 is a view similar to Figure 6 showing a still further modified form;

Figure 8 is a view similar to Figure 7 showing another modified form of impeller blade;

Figure 9 is a diagram showing the torque curve of the invention;

Figure 10 is a sectional view showing a modified form of the invention; and

Figures 11 and 12 are diagrammatic views illustrating the gates of the torque converter in two operative positions.

Figures 1, 2, 3:
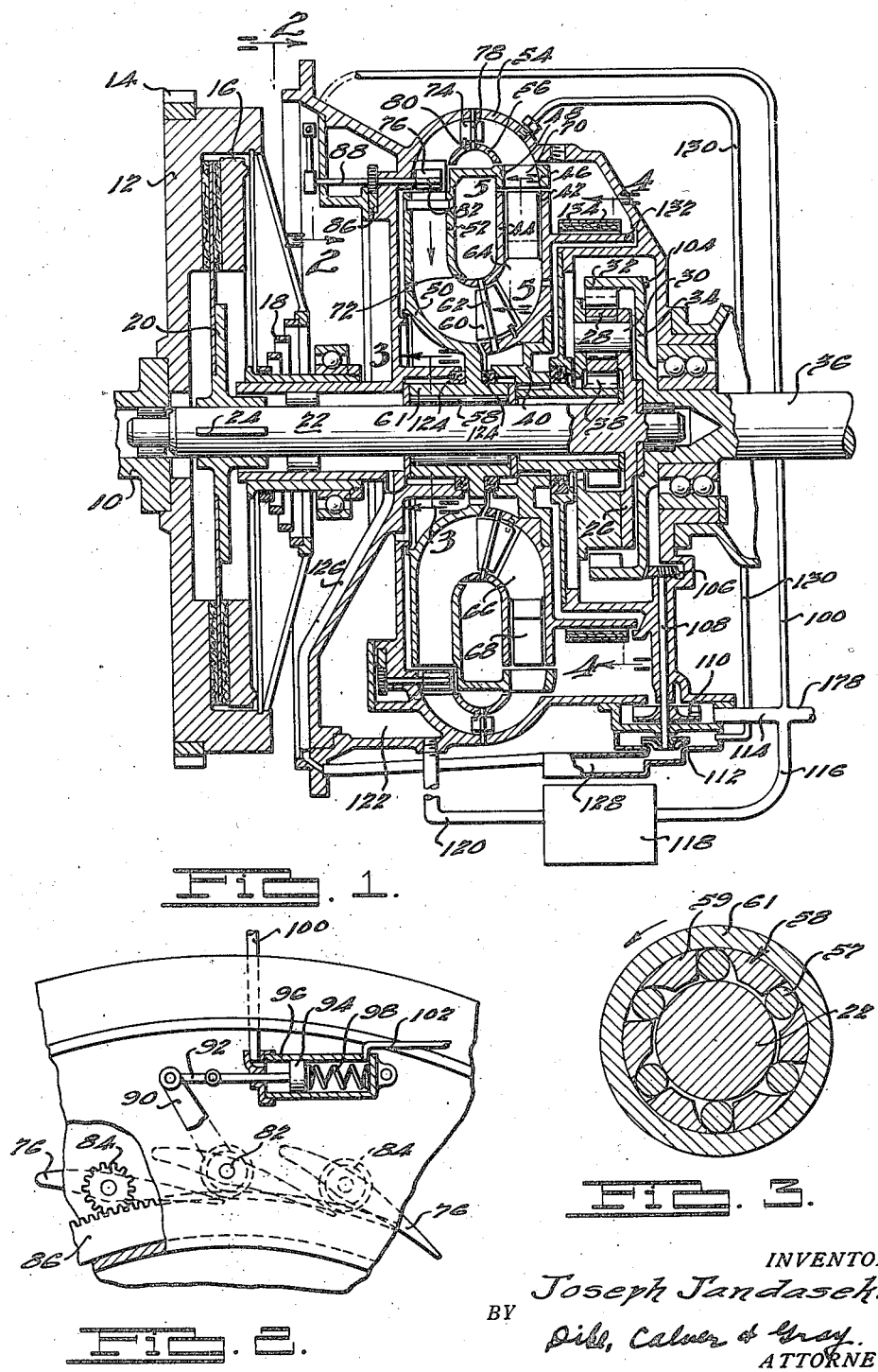
Figure 1 is a longitudinal sectional view through a transmission device embodying the present invention.
Figure 2 is a part sectional view taken substantially on the line 2—2 of Figure 1.
Figure 3 is a sectional view taken substantially on the line 3—3 of Figure 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now more particularly to Figure 1, it will be noted that an engine crankshaft 10 is provided to drive a fly wheel 12 having a geared segment 14 which may be used for starting the engine. Associated with the fly wheel 12 is a friction clutch element designated generally by the reference numeral 16 which may be yieldingly urged into frictional engagement with a surface of the fly wheel by means of a spring 18. Any suitable manually or automatically operated means under the control of the speed of the engine may of course be employed to release the clutch element 16 from the fly wheel 12. A rotatable member 20 of the clutch mechanism 16 may be fixed to a driving shaft 22 by any suitable means such for example as a key 24.

The driving shaft 22 is, as illustrated, preferably extended in length and carries a planet cage 26 which in turn carries a set of spaced planet gears 28 which are free to revolve on pins 30.

The planet gears 28 are in mesh at their outer edges with a ring gear 32 which is operably connected by means of a flange 34 with a driven shaft 36.

The inner edges of the planet gears 28 engage a sun gear 38 which is operably connected through a flange 40 to drive an impeller web 42 of a turbo transmission unit. The turbo transmission unit comprises an impeller, a turbine and guide wheel. The impeller consists of an impeller web 42 and an impeller shroud 44. The turbine comprises a first stage turbine web 46 and a turbine shroud 48, and a second stage turbine web 50 and a second stage turbine shroud 52. The guide wheel comprises a guide wheel housing 54 and a guide wheel shroud 56. Formed between these shrouds, webs and housing is a fluid circuit wherein liquid may circulate absorbing energy from the rotating impeller and transmitting the absorbed energy to the rotatable turbine runner. The turbine web 50 is operably connected through a one-way clutch 58 to transmit energy to the driving shaft 22.

The entrance to the impeller is controlled by a plurality of spaced semi-free vanes 60 pivotally mounted on shafts 62 and movable between spaced stop members 61. A plurality of main blades 64 (see also Figure 5) having a rigid portion 66 and a flexible portion 68 are interposed in the impeller channel between the web 42 and the shroud 44.

Spaced between the turbine webs 46 and 50, and the turbine shrouds 48 and 52 respectively are first and second stage blades 70 and 72 respectively which absorb energy from the circulating liquid and transmit it through the one-way clutch 58 (more clearly illustrated in Figure 3) to the driving shaft 22. The one-way clutch comprises a plurality of spaced rollers 57 interposed between spaced cams 59 carried by a hub portion 61 of the turbine web 50.

Interposed between the first and second stage turbines are a plurality of spaced semi-free vanes 74 and main gates 76 respectively. The semi-free vanes 74 are pivotally mounted on shafts 78 extending from the guide wheel housing 54 to the guide wheel shroud 56. The semi-free vanes 74 are free to operate between the limits defined by spaced stop members 80. The gates 76 are fixed to shafts 82 (see also Figure 2). Each of the shafts 82 is provided with a pinion 84 which meshes with a ring gear 86 whereby the angular inclination of the gates 76 may be varied.

One of the shafts 82 is extended in length as illustrated at 88 and is provided with an arm 90 operably connected through a connecting rod 92 with a piston 94 slidably mounted in the cylinder 96. Holding means, such for example as a spring 98, are provided in the cylinder to yieldingly urge the piston 94 in a direction to decrease the angle of the gates 76. One end of the cylinder 96 is connected to a conduit 100 hereinafter more fully described. The other end of the cylinder 96 is connected by means of a conduit 102 to a source of variable fluid pressure, such for example as the engine manifold.

The flange 34 operably connected to the driven shaft 36 is provided with a beveled gear portion 104 which drives a beveled gear 106 fixed to a shaft 108. The shaft 108 carries a pair of spaced centrifugal pumps 110 and 112 respectively. The pump 110 supplies oil through a conduit 114 connected to the conduit 100 to supply liquid under varying pressures to the cylinder 96 dependent on the speed of the driven shaft.

The pump 110 is also connected through the conduit 114 to a conduit 116 which supplies oil to an oil cooling device 118. After the oil is passed through the cooling device it is discharged to a conduit 120 communicating with the interior of the transmission housing 122. Any liquid which escapes past a sealing gasket 124 from the liquid circuit formed by the impeller, turbines and guide wheel is discharged through a conduit 126 to a sump 128. The pump 112 driven by the shaft 108 serves to transmit oil from the sump 128 through a conduit 130 to the interior of the housing.

The impeller web 42 is provided with a generally horizontally extending drum 132 (see also Figure 4). Means are provided to engage the drum 132 to lock the impeller 42 against rotation. One desirable form of locking means is more clearly illustrated in Figure 4 and comprises a brake band 134. The band 134 is provided with spaced actuating members 136 and 138 respectively. The member 136 may be operated by a cam member 140 fixed to a lever 142 and pivotally mounted on a stationary shaft 144. The member 138 is preferably operated through a connecting link 146 operably connected to a link 148 pivotally mounted on the shaft 144. The link 146 is provided with a slot 150 which receives a pin 152 carried by the link 148 to permit more complete release of the brake band 134 from the drum 132 when it is desired to use the engine as a brake. A spring 154 is interposed between the members 136 and 138 to yieldingly urge the brake band 134 toward the inoperative position.

The lever 142 may be operated in any desired manner, such for example as by means of a diaphragm 156 positioned in a housing 158.

The surface of the diaphragm 156 within the housing 158 may be subjected to variable fluid pressure such for example as oil pressure or air pressure or vacuum from the engine. When it is desired to operate the diaphragm 156 by means of oil pressure, any suitable pump driven by the engine may be employed to transmit oil under pressure to a conduit 160. The supply of oil from the conduit 160 to the interior of the housing 158 is controlled by a valve 162, and a discharge conduit 164 is provided to permit the fluid to escape from the housing 158 under certain operating conditions.

The valve 162 may be controlled by means of a lever 166 operably connected thereto in any desired manner such for example as by means of a pin 168 operable between bifurcated portions 170 of the lever 166. A link 172 operably connected to the lever 166 is pivotally connected to a piston 174. The piston 174 is slidably mounted in a cylinder 176 which communicates by way of a conduit 178 with the conduit 114 which receives oil from the pump 110 driven by the shaft 108. If desired the lever 166 may be manually controlled by any desired means such for example as a knob 167.

Means are provided to vary the position of the lever 166 in proportion to throttle opening of the engine. One desirable form of mechanism for accomplishing this purpose comprises a spring 180 operably connected to the lever 166 at one end and operably connected at its other end to the lever 182 pivotally mounted at 184. The other end of the lever 182 is pivotally connected to the link 186 which moves proportionately to variations in movement of the accelerator pedal controlling the throttle position.

In the operation of this device, the clutch 16 is employed only at extremely low speeds or when it is desired to hold the vehicle from creeping forward while the engine is running. Power is transmitted through the rotatable member 20 to the driving shaft 22 and through the pinions 28. At this point a division in the power is effected in that a portion of the power is transmitted through the ring gear 32 and flange 34 to the driven shaft 36. The remainder of the power is transmitted through the sun gear 38 to the impeller 42. The impeller energizes the liquid contained in the liquid circuit and the energy stored in the liquid is transmitted through the first and second stage turbines and the one-way clutch 58 back to the driving shaft 22. It will be understood of course that any desired number of stages or power transferring elements may be employed in the fluid circuit to impart the energy of the liquid from the impeller to the turbine.

Referring now to Figure 9, attention is called to the fact that torque output factors are plotted on the abscissa, and the turbo torque ratios are plotted on the ordinates. It will be observed from an examination of this figure that the output torque is extremely high for comparatively small turbo torque ratio. Referring to the point 190 on the chart, it will be noted that with a turbo torque ratio of approximately 3⅓ on the ordinate, a torque output ratio of 8 on the abscissa is obtained. As the turbo torque ratio is increased slightly enormous increases are effected in the torque output ratio as illustrated by the curve 192. This curve is based on a planetary gear ratio of 2.67:1. Attention is also directed to the fact that with a ratio of 1:1 output through the impeller approximately 37% of the power is transmitted through the turbo transmission unit and approximately 63% of the energy is transmitted directly by the gears to the driven shaft 36. It will be noted that the point 194 on the abscissa corresponds to the ratio which is obtained when the impeller is locked thereby rendering the turbo unit inoperative whereupon over drive through the gearing is effected.

Referring now to Figure 10, I have illustrated a turbo transmission of a modified form. A driving shaft 200 is operably connected to drive an impeller web 202 and an impeller shroud 204. A turbine web 206 and shroud 208 are fixed to a driven shaft 210. The impeller is provided with semi-free vanes 212 carried by a shaft 214 projecting into the impeller web 202 and the impeller shroud 204. The semi-free vanes 212 are free to move relative to the shaft 214 to vary the angular relation within the limits defined by spaced stop members 216. An impeller is also provided with a plurality of spaced main blades 218 having rigid portions 220 and flexible portions 222.

The turbine is provided with a plurality of spaced blades which may be curved in any desired manner to impart the desired deflection to the liquid circulating within the transmission housing.

The guide wheel is preferably interposed between the impeller and the turbine and comprises a plurality of spaced semi-free vanes 224 mounted on shafts 226 and free to move angularly within limits defined by spaced step members 228 to vary the deflection of the liquid circulating within the housing. A plurality of spaced main gates 230 are mounted on a shaft 232 projecting through the core 234 and a housing 236 mounted on the driving and driven shafts 200 and 210. If desired, a shroud 238 may be provided adjacent the lower ends of the semi-free vanes 224 and the gates 230 to strengthen this construction. A plurality of vanes 240 are mounted on the shaft 232 and are interposed between the upper edge of the impeller and turbine as illustrated. The main gates 230 and the vanes 240 may be moved to close the circuit when it is desired to render the fluid circuit inoperative to prevent the vehicle from creeping forward while the engine is operating.

The main gates 230 and the vanes 240 may be actuated by means of gears 242 fixed to each of the shafts 232. The gears 242 mesh with a ring gear 244 to control all of the gates and vanes simultaneously. One of the shafts 232 is extended as illustrated at 246 and is provided with a lever 248 which is operably connected to a piston 250 by means of a connecting rod 252. The piston 250 is slidably mounted in a cylinder 254 which communicates by way of a conduit 256 with a source of variable fluid pressure, such for example, as the intake manifold of the engine.

In view of the fact that the compression ratio and the power output of engines varies in proportion to the load on the engine it is desirable to increase the load on the engine at light loads as when the vehicle is travelling over level roads, and to decrease the load on the engine at heavy loads as when the vehicle is going up a hill or is carrying a heavy load. I have found that this desirable variation can be accomplished by varying the angular positions on the guide wheel. It is of course desirable that the means controlling the variation of angular relation of the gates be under the influence of engine operating variabilities, such for example as variations in manifold pressure. For example, at light loads of the engine it is desirable to increase the load on the engine, which result may be accomplished by opening the main gates on the guide wheel as illustrated in Figure 11 wherein the angular relation of the gates is increased. At heavy loads it is desirable to decrease the load whereupon the main gates may be moved in the closing direction to decrease their angles as illustrated in Figure 12.

Figures 6, 7 and 8 illustrate modified embodiments of impeller blades which may be substituted for the impeller blade illustrated in Figure 5. Referring to Figure 6, it will be observed that the vane comprises an inlet portion 260. Attached to the portion 260 is a rearwardly extending flexible portion 262 having resilient material such as rubber 264 molded or otherwise applied thereto to embody the desired configuration to deflect the liquid to the desired extent.

The vanes illustrated in Figures 5 and 6 will be deflected to the dotted line positions at heavy loads whereupon the discharge angle is decreased and the effective diameter of the impeller is also decreased. Attention is called to the fact that the flexible portion 262 of Figure 6 is formed of a single strip of flexible metal which is folded over the pin 266 and projects backward a portion of the length of the resilient material to reinforce the structure and impart thereto the desired degree of flexibility of the vane.

Figure 7 embodies an entrance portion 270 to which a flexible tail portion 272 is applied. The portion 272 may be formed of any desired resilient material such for example as rubber, and may be dovetailed into the entrance portion 270 as illustrated at 274.

The blade illustrated in Figure 8 embodies a pair of stationary pins 280 and 282 which may be mounted in the impeller web and shroud members. A flexible tail portion 284 is pivotally mounted on the stationary pin 282 and is provided with a crown section 286 adapted to fit within a forked portion 288 of a member 290 mounted on the stationary pin 280. The tail portion 284 is thus free to move angularly under the influence of fluid pressures exerted against it, and as it moves angularly it pivots about the stationary pin 282 to vary the angular relation of the nose portion 292 by means of the fork and crown mechanism 286 and 288. The stationary pins 280 and 282 together with the fork and crown actuating mechanism 286 and 288 may be covered by means of a shell 294 molded or otherwise suitably attached thereto.

It is to be understood that various features disclosed in the different figures may be combined with corresponding features of other figures without departing from the spirit of my invention.

I claim:

1. In a transmission for a throttle controlled engine having a source of fluid pressure, a driving shaft, a driven shaft, power transmitting means including planetary gearing interposed between the driving and driven shafts, a turbo unit comprising a rotatable impeller element driven by the planetary gearing to impart energy to a circulating medium and a rotatable turbine element concentrically mounted on the driving shaft to absorb energy from the circulating medium, a one-way driving connection between said turbine element and the driving shaft, and means actuated by said fluid pressure and influenced by throttle position to render inoperative the turbo unit.

2. In a transmission for a throttle-controlled engine having a source of variable fluid pressure, a driving shaft, a driven shaft, power transmitting means including planetary gearing interposed between the driving and driven shafts, a turbo unit comprising a rotatable impeller element driven by the planetary gearing to impart energy to a circulating medium and a rotatable turbine element concentrically mounted on the driving shaft to absorb energy from the circulating medium, a one-way driving connection between said turbine element and the driving shaft, and means controlled by said source of variable fluid pressure and influenced by throttle position to lock the impeller element against rotation thereby rendering the turbo unit inoperative whereupon power is transmitted from the driving shaft to the driven shaft through said planetary gearing.

3. In a transmission to transmit power from a throttle controlled engine having a source of fluid pressure, a driving shaft, a driven shaft, planetary gearing means interposed between the driving and driven shafts, a fluid power transmission comprising a rotatable impeller and a rotatable turbine, connecting means between the planetary gearing and the impeller, one-way driving means between the turbine and driving shaft, and means actuated by said fluid pressure and influenced by throttle position to render the fluid power transmission inoperative.

4. In a transmission to transmit power from a throttle controlled engine having a source of fluid pressure, a driving shaft, a driven shaft, planetary gearing means interposed between the driving and driven shafts, a fluid power transmission comprising a rotatable impeller and a rotatable turbine, one-way driving means between the planetary gearing and the impeller, one-way driving means between the turbine and driving shaft, a flange carried by the impeller, and friction means actuated by said fluid pressure and influenced by throttle position to render the fluid power transmission inoperative to transmit power from the driving shaft through the planetary gearing to the driven shaft.

5. In a transmission for an engine having a source of fluid pressure, a driving shaft, a driven shaft, planetary gearing interposed between the driving and driven shafts, a fluid power transmission having an impeller and a turbine, driving means between the planetary gearing and impeller, one-way driving means between the turbine and the driving shaft, a braking surface carried by the impeller, friction means adapted to engage said braking surface, and means actuated by the source of fluid pressure controlling the friction means to stop the impeller thereby rendering the fluid power transmission inoperative.

6. In a transmsision for a throttle controlled engine having a check valve controlled pump forming a source of constant fluid pressure and a source of variable fluid pressure, a driving shaft, a driven shaft, planetary gearing interposed between the driving and driven shafts, a fluid power transmission having an impeller and a turbine, driving means between the planetary gearing and impeller, one-way driving means between the turbine and the driving shaft, a cylindrical flange carried by the impeller, friction means adapted to engage said cylindrical flange, means actuated by the source of constant fluid pressure controlling the friction means to stop the impeller, and variable fluid pressure actuated means influenced by throttle position controlling said constant fluid pressure actuated means to render the fluid power transmission inoperative and transmit power at over drive.

7. In a fluid power transmission for an engine, driving and driven shafts, planetary gearing interposed between said shafts, rotatable impeller and turbine wheels forming a circuit in which fluid circulates to transmit power, connecting means between the planetary gearing and the impeller wheel, one-way driving means between the turbine wheel and the driving shaft, a plurality of spaced angularly movable main gates interposed between the impeller and turbine wheels, a plurality of shafts carrying said gates, means associated with the shafts to move the gates angularly in unison, a fluid pump driven by the driven shaft to form a source of variable fluid pressure, and means actuated by said variable fluid pressure to vary the angular relation of the gates.

8. In a fluid power transmission for an engine subjected to variable loads and having an intake manifold, rotatable impeller and turbine wheels forming a circuit in which fluid circulates to transmit power, a plurality of spaced angularly movable main gates interposed between the impeller and turbine wheels, a plurality of shafts carrying said gates, means associated with the shafts to move the gates angularly in unison, and means actuated by variations of fluid pressure in the manifold to move the gates angularly to increase their angle of attack in the fluid circuit thereby opening the circuit to increase the load on the engine when it is subjected to light loads and to move the gates angularly to decrease their angle of attack in the fluid circuit thereby closing the circuit to decrease the load on the engine when it is subjected to heavy loads.

9. In a transmission for an engine having a check valve controlled fluid pump forming a substantially constant source of fluid pressure, a driving shaft, a driven shaft, planetary gearing including concentrically mounted sun and ring gears carried by the driving and driven shafts, a fluid transmission comprising an impeller driven by the sun gear, a turbo runner energizing the driving shaft, a source of variable fluid pressure driven by the ring gear, means associated with the impeller to render the fluid transmission inoperative, means actuated by the source of substantially constant fluid pressure to actuate the last named means, and control means actuated by the variable fluid pressure to automatically render the fluid transmission operative or inoperative dependent on the speed of the driven shaft.

10. In a transmission for a throttle controlled engine having a fluid pump forming a substantially constant source of fluid pressure, a driving shaft, a driven shaft, planetary gearing including concentrically mounted sun and ring gears carried by the driving and driven shafts, a fluid transmission comprising an impeller driven by the sun gear, a turbo runner energizing the driving shaft, a source of variable fluid pressure driven by the ring gear, means including a flange associated with the impeller to render the fluid transmission inoperative, means including a chamber having a movable wall actuated by the source of substantially constant fluid pressure to actuate the last named means, means including a valve actuated by the variable fluid pressure to control the fluid pressure exerted in said chamber to render the fluid transmission operative or inoperative dependent on the speed of the driven shaft, and means actuated by movement of the engine throttle to influence the position of said valve.

11. A variable speed power transmission comprising a driving shaft, a driven shaft, means forming a mechanical power transmitting connection between said shafts to provide drive therebetween, hydraulic variable speed power transmitting mechanism comprising an impeller driven by the mechanical power transmitting connection and a turbine concentrically mounted on the driving shaft and operably connected thereto through one-way driving means for transmitting power from the mechanical power transmitting connection to the driving shaft, means for selectively engaging the first named means to transmit power from the driving shaft to the driven shaft, means for selectively transmitting power through the hydraulic mechanism, and speed responsive means for rendering the hydraulic mechanism inoperative.

JOSEPH JANDASEK.